United States Patent
Dolan et al.

(10) Patent No.: US 12,393,773 B1
(45) Date of Patent: Aug. 19, 2025

(54) AUTOMATICALLY POPULATING DOCUMENTS ABOUT SPECIAL ENTITIES

(71) Applicant: Intuit Inc., Mountain View, CA (US)

(72) Inventors: Tiffany Dolan, San Francisco, CA (US); David Matz, New York City, NY (US); Shashank Mendiratta, San Jose, CA (US); Karen Wai, Stouffville (CA); Mithun Ghosh, Bangalore (IN); Ankit Agarwal, Newark, CA (US); Azal Fatima, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/210,979

(22) Filed: May 16, 2025

(51) Int. Cl.
*G06F 40/166* (2020.01)
*G06F 16/901* (2019.01)
*G06F 16/93* (2019.01)
*G06F 40/30* (2020.01)
*G06F 40/40* (2020.01)

(52) U.S. Cl.
CPC ........ *G06F 40/166* (2020.01); *G06F 16/9027* (2019.01); *G06F 16/93* (2019.01); *G06F 40/30* (2020.01); *G06F 40/40* (2020.01)

(58) Field of Classification Search
CPC ......... G06F 40/166; G06F 40/40; G06F 40/30
See application file for complete search history.

(56) References Cited

U.S. PATENT DOCUMENTS

| | | | | |
|---|---|---|---|---|
| 11,494,551 | B1 * | 11/2022 | Espinas | G06N 20/00 |
| 11,538,112 | B1 * | 12/2022 | Singh | G06Q 10/10 |
| 11,615,236 | B1 * | 3/2023 | Sharma | G06F 40/174 |
| | | | | 715/222 |
| 11,874,823 | B1 * | 1/2024 | Siekman | G06F 16/2365 |
| 12,271,423 | B1 * | 4/2025 | Veron Vialard | G06F 16/2237 |
| 2019/0332646 | A1 * | 10/2019 | Roney | H04L 51/18 |
| 2020/0117718 | A1 * | 4/2020 | Lundberg | G06F 16/353 |
| 2020/0167412 | A1 * | 5/2020 | Rakshit | G06N 3/08 |
| 2021/0005289 | A1 * | 1/2021 | Graham | G16H 10/20 |
| 2021/0097491 | A1 * | 4/2021 | Minyard | G06N 20/00 |
| 2021/0295031 | A1 * | 9/2021 | Shorter | G06F 16/35 |
| 2021/0303780 | A1 * | 9/2021 | Dintenfass | G06F 40/174 |
| 2021/0350011 | A1 * | 11/2021 | Ashlock | G06N 20/00 |
| 2022/0058383 | A1 * | 2/2022 | Seth | G06V 30/19107 |
| 2022/0101061 | A1 * | 3/2022 | Mehta | G06N 20/00 |
| 2022/0318921 | A1 * | 10/2022 | Tucker | G06Q 30/0202 |

(Continued)

*Primary Examiner* — Daniel Rodriguez
(74) *Attorney, Agent, or Firm* — Paradice & Li LLP

(57) ABSTRACT

Systems and methods for automatically populating documents about special entities are disclosed herein. An example method is performed by one or more processors of a computing system. The example method may include receiving user data, extracting a list of entities associated with the user and a list of events that occurred between the user and the entities, transforming metadata for the events associated with entities of interest into vectorized embeddings, selectively classifying, using a binary classifier model, ones of the entities as special entities and ones of the events as special events for a set of documents, assigning, using a multi-class classifier model, one of a plurality of categories to each special event associated with each special entity, each of the categories mapping to a corresponding section within the set of documents, and populating, for each special entity, the corresponding sections within the set of documents based on the categories.

20 Claims, 6 Drawing Sheets

(56) References Cited

U.S. PATENT DOCUMENTS

| | | | | |
|---|---|---|---|---|
| 2022/0319646 | A1* | 10/2022 | Mukherjee | G16H 10/60 |
| 2023/0065089 | A1* | 3/2023 | Lee | G06F 40/35 |
| 2023/0065915 | A1* | 3/2023 | Berestovsky | G06V 30/1448 |
| 2023/0177625 | A1* | 6/2023 | Dickerson | G06Q 50/18 |
| | | | | 705/80 |
| 2023/0186201 | A1* | 6/2023 | Cella | G05B 19/4183 |
| | | | | 705/7.17 |
| 2024/0104305 | A1* | 3/2024 | Glesinger | G06V 10/421 |
| 2024/0144141 | A1* | 5/2024 | Cella | G06Q 30/0206 |
| 2024/0184981 | A1* | 6/2024 | Murdock, IV | G06F 40/30 |
| 2024/0241926 | A1* | 7/2024 | Hunt | G06F 40/174 |
| 2024/0310555 | A1* | 9/2024 | Holmes | G01V 20/00 |
| 2025/0103797 | A1* | 3/2025 | Wisoff | G06F 8/35 |
| 2025/0157598 | A1* | 5/2025 | Hill | G06Q 10/10 |
| 2025/0201364 | A1* | 6/2025 | Mukherjee | G06F 40/20 |

* cited by examiner

AUTOMATICALLY POPULATING DOCUMENTS ABOUT SPECIAL ENTITIES

TECHNICAL FIELD

This disclosure relates generally to computer-based automatic population of documents, and specifically to automatically populating documents about special entities.

DESCRIPTION OF RELATED ART

In various domains, there is a frequent need to generate documents that contain information about specific individuals, organizations, or other unique entities. Such documents may include regulatory filings, contracts, compliance documentation, internal records, personal reports, or the like. The process of creating such documents is often manual, repetitive, and prone to errors, particularly when it involves gathering and inserting complex or structured data from multiple sources. Furthermore, in many instances, specific sections of documents must be populated with precise, contextually accurate information to comply with strict regulations, contractual provisions, or corporate governance requirements imposed by higher level entities.

Traditionally, users have been required to locate relevant information about a given entity, verify its accuracy, and then enter it into predefined document templates, for example. This can be time-consuming and inefficient, particularly when dealing with large volumes of entities, associated information or events, or frequently updated document requirements. Furthermore, maintaining consistency across multiple documents that reference information associated with a same entity or determining which of a plurality of documents applies for a particular entity presents challenges. As one example, in a large organization with multiple entities, only particular entities (e.g., subsidiaries) and/or particular events (e.g., mergers, acquisitions, jurisdictional audits) may require custom agreements, and identifying which entity-event combinations trigger special document generation can be a labor-intensive and error-prone task made even more complicated when populating the documents themselves.

Some automated solutions exist to aid in document creation, such as template-based generation tools, simple rule-based filters, and customer relationship management (CRM) systems with mail merge capabilities. However, these systems are often limited in scope and flexibility. They may require significant manual input, lack integration with external data sources, or fail to adapt dynamically to various document and entity types. Furthermore, although some approaches have attempted to use artificial intelligence (AI)-based techniques (e.g., natural language processing (NLP) and template-based machine learning (ML)) for automating document population, such approaches tend to over-generalize, have low accuracy, yield unacceptable levels of false positives and/or false negatives, have difficulty in particular domains, and lack enough contextual understanding to reliably distinguish which entities and events may be pertinent to a particular document.

There is, therefore, a significant need for an efficient system and method for automatically and accurately populating documents with information about entities and events.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter described in this disclosure can be implemented as a method for automatically populating documents about special entities. An example method is performed by one or more processors of a computing system. The example method can include receiving a transmission over a communications network from a computing device, the transmission including user data associated with a user of the computing system, extracting, from the user data, a list of entities associated with the user and a list of events that occurred between the user and the entities, transforming metadata for the events associated with entities of interest into vectorized embeddings in a vector space, selectively classifying, using the vectorized embeddings in conjunction with a binary classifier model, ones of the entities of interest as special entities and ones of the transformed events as special events for a set of documents, assigning, using the vectorized embeddings in conjunction with a multi-class classifier model, one of a plurality of categories to each special event associated with each special entity, each of the categories mapping to a corresponding section within the set of documents, and populating, for each special entity, the corresponding sections within the set of documents based on the categories assigned to the special entity's special events.

Another innovative aspect of the subject matter described in this disclosure can be implemented in a computing system for automatically populating documents about special entities. An example system includes one or more processors and at least one memory coupled to the one or more processors and storing instructions that, when executed by the one or more processors, cause the system to perform operations. The operations can include receiving a transmission over a communications network from a computing device, the transmission including user data associated with a user of the computing system, extracting, from the user data, a list of entities associated with the user and a list of events that occurred between the user and the entities, transforming metadata for the events associated with entities of interest into vectorized embeddings in a vector space, selectively classifying, using the vectorized embeddings in conjunction with a binary classifier model, ones of the entities of interest as special entities and ones of the transformed events as special events for a set of documents, assigning, using the vectorized embeddings in conjunction with a multi-class classifier model, one of a plurality of categories to each special event associated with each special entity, each of the categories mapping to a corresponding section within the set of documents, and populating, for each special entity, the corresponding sections within the set of documents based on the categories assigned to the special entity's special events.

Another innovative aspect of the subject matter described in this disclosure can be implemented as a non-transitory computer-readable medium storing instructions that, when executed by one or more processors of a system for automatically populating documents about special entities, cause the system to perform operations. Example operations include receiving a transmission over a communications network from a computing device, the transmission including user data associated with a user of the computing system, extracting, from the user data, a list of entities associated with the user and a list of events that occurred between the user and the entities, transforming metadata for the events associated with entities of interest into vectorized embeddings in a vector space, selectively classifying, using the vectorized embeddings in conjunction with a binary classifier model, ones of the entities of interest as special entities and ones of the transformed events as special events for a set of documents, assigning, using the vectorized embeddings in conjunction with a multi-class classifier model, one of a plurality of categories to each special event associated with each special entity, each of the categories mapping to a corresponding section within the set of documents, and populating, for each special entity, the corresponding sections within the set of documents based on the categories assigned to the special entity's special events.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
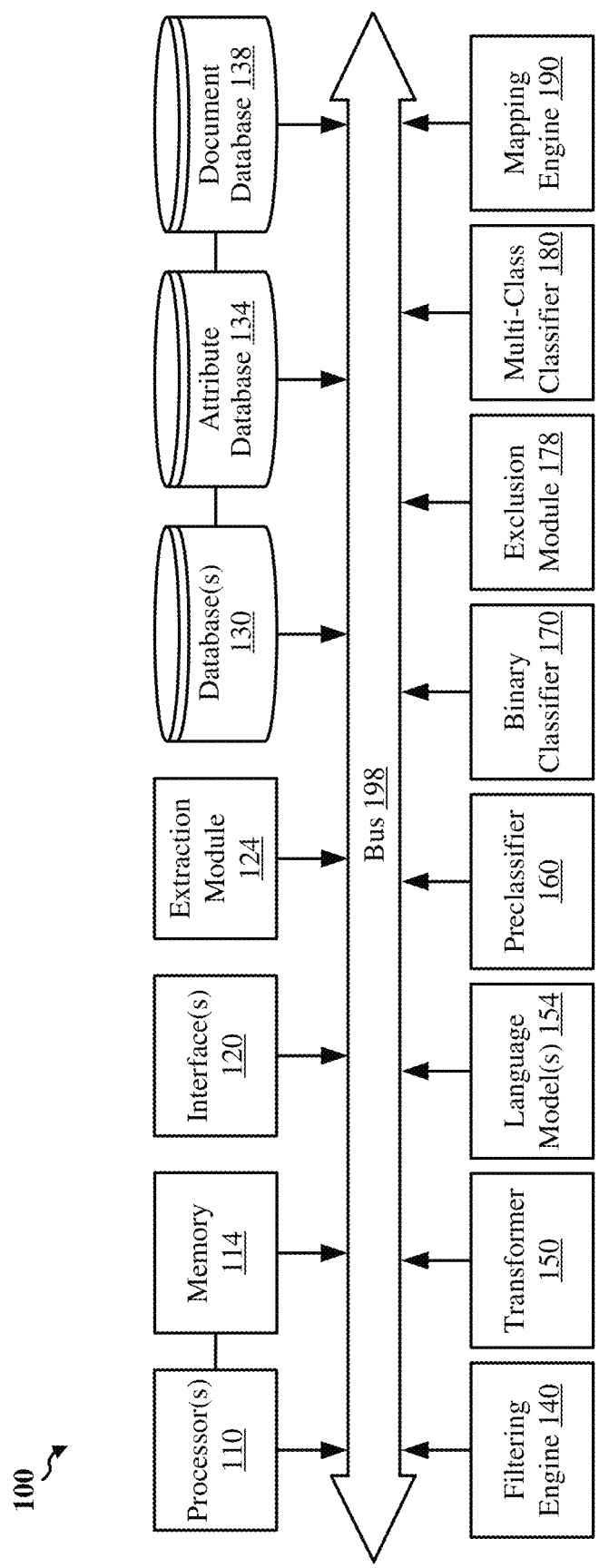
FIG. 1 shows an example computing system, according to some implementations.

As described above, document generation in various domains is often a manual, repetitive process that requires gathering complex, structured data about entities from multiple sources and is highly prone to errors. Existing template-based tools, simple rule-based filters, mail-merge systems, and even AI-based techniques have fallen short due to limited scope, heavy manual input requirements, poor integration with external data, and low contextual accuracy leading to unacceptable error rates. Consequently, there is a pressing need for a robust, automated solution capable of accurately and efficiently populating documents with entity-specific information.

Aspects of the present disclosure provide innovative systems and methods for automatically populating documents about special entities using a computing system. Specifically, the various systems and methods disclosed herein automatically gather user information (e.g., transmitted over a network) without any need for manual data entry, and the data is processed to generate lists of entities and events that are relevant to the user. Detailed metadata associated with the user's data is transformed into vector embeddings that capture contextual meaning. A binary classifier uses the vector embeddings to determine which entities and events are "special" (i.e., should be included in a set of documents). A multi-class classifier assigns each special event to one of several predefined categories that each map to a particular section of one of the documents, thereby dynamically linking the categories to the correct sections of the document so that each detail can be entered into its correct section. Each section is then automatically filled with the entity-specific information based on the embeddings and classifications. By combining automated data collection, advanced embedding, and intelligent classification from multiple tiers of ML models, the systems and methods disclosed herein eliminate repetitive manual work and reduce error in document generation. Furthermore, the systems and methods disclosed herein can provide users with fully populated, accurate documents in at least near real-time, thereby transforming a once-tedious process into a seamless, reliable workflow.

For purposes of discussion herein, an "entity" refers to any distinct actor, object, or concept—such as a person, an organization or sub-unit of an organization, a provider, a vendor, an associate, an animal, an item, or otherwise—that may be associated with one or more events and relevant to and represented within a document. For purposes of discussion herein, an "event" is any activity, occurrence, record, action, or state change associated with an entity that may be relevant to a document, including but not limited to personal activities (e.g., social interactions, journal entries), transactions, digital interactions (e.g., website or social media activity), security incidents, gaming events, or otherwise. For purposes of discussion herein, a "document" refers to any structured or semi-structured artifact—such as a report, form, dataset, log, summary, record, chronicle, interaction history, ledger, archive, or otherwise—that contains one or more sections designed to receive information about entities and/or events. For purposes of discussion herein, "populating" a document refers to selecting and assigning appropriate information derived from entities and events to specific sections of the document, thereby preparing it for generation or completion. For purposes of discussion herein, a "special entity" is an entity that the system has deemed as particularly relevant or significant to one or more target documents, based on a combination of predefined criteria, contextual analysis, and trained models. For purposes of discussion herein, a "special event" is an event that the system has deemed as particularly relevant or significant to one or more target documents, based on a combination of predefined criteria, contextual analysis, and trained models.

The systems and methods disclosed herein can be deployed for automatically populating documents about special entities in a variety of domains. A non-limiting example of "entities" in a customer relationship management (CRM) system may be potential or existing clients; "events" may be records of interactions such as calls, emails, meetings, demonstrations, or purchases; a "document" may be a sales activity report or a client interaction summary populated by the system; a "special entity" may be a client deemed (e.g., by the system using trained models in conjunction with attributes related to deal size and relevant dates) as high-value that is nearing a deal closure; and a "special event" may be a large purchase event or an important meeting deemed (e.g., by the system using trained models in conjunction with attributes such as monetary value or event type significance) significant for inclusion in the document. Similarly, a non-limiting example of "entities" in help desk or customer support systems may be customers or their specific issues; "events" may be the opening, resolution, or escalation of support tickets, along with associated communications; a "document" may be a customer support interaction history or a Service Level Agreement (SLA) compliance report populated by the system; a "special entity" may be a VIP customer experiencing a recurring critical issue deemed (e.g., by the system using trained models in conjunction with attributes related to customer status and issue severity) critical for detailed tracking; and a "special event" may be an escalation due to an SLA breach or the resolution of a critical ticket deemed (e.g., by the system using trained models in conjunction with attributes related to impact analysis or predefined rules like SLA breach status) significant for inclusion in the document. In project management tools, a non-limiting example of "entities" may be project members, tasks, or deliverables; "events" may be task assignments, status updates, file uploads, or project-related communications; a "document" may be a project status report or task completion log populated by the system; a "special entity" may be a task on the critical path or a key deliverable nearing deadline deemed (e.g., by the system using trained models in conjunction with attributes related to project plan dependencies or deadline proximity) crucial; and a "special event" may be the completion of a major milestone or a significant delay notification deemed (e.g., by the system using trained models in conjunction with attributes related to milestone status or impact assessment) significant for inclusion in the document. For social media or communication platforms, a non-limiting example of "entities" may be users, groups, or pages; "events" may be messages sent, posts liked or shared, comments made, or connections established; a "document" may be a community engagement summary or user activity log populated by the system; a "special entity" may be an influential user or a specific group deemed (e.g., by the system using trained models in conjunction with attributes such as influence scores or activity levels) relevant for targeted analysis; and a "special event" may be a post with unusually high engagement or a flagged message deemed (e.g., by the system using trained models in conjunction with attributes such as engagement thresholds or content analysis rules) significant for inclusion in the document. Within website or application activity tracking, a non-limiting example of "entities" may be specific pages, features, or other users; "events" may be page views, button clicks, form submissions, or user interactions such as sending messages; a "document" may be a user journey analysis report or feature usage dataset populated by the system; a "special entity" may be a feature critical to conversion or a key landing page deemed (e.g., by the system using trained models in conjunction with attributes related to goal completion) critical; and a "special event" may be a form submission indicating a lead, a cart abandonment, or a high error rate interaction deemed (e.g., by the system using trained models in conjunction with attributes related to conversion goals or anomaly detection rules) significant for inclusion in the document. In financial systems, a non-limiting example of "entities" may be accounts, counterparties, vendors, payees, recipients, contractors, or specific financial instruments; "events" may be transactions, expenses, exchanges, payments, transfers, account balance changes, or communications regarding financial activities; a "document" may be a financial transaction ledger, a tax-related form such as one or more form 1099 types, an expense report summary, or an audit trail record populated by the system; a "special entity" may be a high-value counterparty, a vendor appropriate for receiving a form 1099, a new vendor, or a sensitive account deemed (e.g., by the system using trained models in conjunction with attributes such as location or type) relevant to the document; and a "special event" may be a transaction exceeding a limit, a transaction suitable for reporting on a form 1099, an international transfer, or a flagged unusual expense deemed (e.g., by the system using trained models in conjunction with attributes such as quantity, type, and thresholds) particularly relevant for inclusion in the document. With respect to security or access logs, a non-limiting example of "entities" may be specific systems, resources, or users; "events" may be login attempts, file access records, permission changes, or security alerts; a "document" may be a security incident report or access control log summary populated by the system; a "special entity" may be a critical server, sensitive database, or administrator account deemed (e.g., by the system using trained models in conjunction with attributes related to classification or user role) as requiring close monitoring; and a "special event" may be multiple failed logins followed by success from an unusual location, unauthorized access attempts, or privilege escalation deemed (e.g., by the system using trained models in conjunction with attributes such as event sequence or location data) highly significant for inclusion in the document. Within gaming platforms, a non-limiting example of "entities" may be players, game objects, or in-game features; "events" may be actions taken within the game, interactions with other players, or achievements earned; a "document" may be a player behavior analysis record or anti-cheat investigation summary populated by the system; a "special entity" may be a player exhibiting potentially fraudulent behavior or a high-value item involved in suspicious trades deemed (e.g., by the system using trained models in conjunction with attributes related to activity patterns) suspicious; and a "special event" may be a rapid sequence of high-value item acquisitions or the triggering of an anti-cheat mechanism deemed (e.g., by the system using trained models in conjunction with attributes such as action frequency) significant for inclusion in the document, and so on.

The computing system described herein provides several technical benefits over conventional solutions for automatically populating documents. By automatically gathering user information transmitted over a network without manual data entry, the system reduces human error, accelerates data ingestion, and saves billable hours for users and professionals. By automatically sorting and categorizing large sets of heterogeneous data using embeddings and AI classifiers, the system streamlines data organization. By transforming detailed metadata into high-dimensional vector embeddings that capture contextual semantics, the system enables precise semantic disambiguation, improves classification accuracy, and reduces the risk of misclassification. By employing a binary random forest classifier on the embeddings to filter for special entities and events, the system minimizes computational overhead and handles class imbalance effectively. By applying a multi-class random forest classifier to assign special events to predefined categories, the system incorporates specialized feature importance per class, enhances categorization precision, and simplifies model maintenance through modular retraining. By dynamically linking classification outputs to corresponding document sections, the system automates content mapping, ensures consistent document structure, and eliminates manual section-mapping errors. By automatically populating each document section with entity-specific information based on embeddings and classifier outputs, the system delivers fully populated documents in near real-time, reduces generation and review time, and increases user confidence by ensuring no special entities or events are omitted. By integrating context-aware embeddings, the system interprets nuanced language usage, differentiates homonyms, and enhances downstream model understanding of user intent. By monitoring classification confidence and learned pattern deviations, the system enables the flagging of items that require additional processing, human review, and/or proactive exception handling. By combining automated data collection, advanced embedding generation, and multi-tier machine learning classification, the system eliminates repetitive manual workflows, reduces error rates, and increases overall document generation throughput. By aggregating embedding and classifier outputs into customizable reports, the system can generate summaries and dashboards that provide users with actionable insights.

Aspects of the present disclosure address the technical problem of manual, repetitive document generation processes that require gathering complex, structured data about entities from multiple sources and are highly prone to errors due to the limited scope, heavy manual input requirements, poor integration with external data, and low contextual accuracy of existing template-based tools, rule-based filters, mail-merge systems, and AI-based techniques, which did not exist in the pre-Internet world before the invention of networked computing systems, large-scale digital databases, machine learning (ML), natural language processing (NLP), and vector embedding techniques. Accordingly, the problem addressed by the aspects of the present disclosure is rooted in and arises in computer technology. Furthermore, the present disclosure describes a solution to the technical problem. In particular, the Specification and the claims provide a method of automatically generating and populating documents with entity-specific information using ML models, which includes automatically gathering user information transmitted over a network without manual data entry; processing the data to generate lists of relevant entities and events; transforming detailed metadata into vector embeddings that capture contextual meaning; applying a binary classifier to identify which entities and events are "special"; using a multi-class classifier to assign each special event to predefined categories that map to specific document sections; dynamically linking each category to its corresponding document section; and automatically filling each section with the entity-specific information based on the embeddings and classifications. Aspects of the present disclosure provide many practical applications by solving a problem rooted in and arising in computer technology and providing improvements to computer functionality.

Furthermore, aspects of the subject matter disclosed herein are not an abstract idea, such as a mere mental process that can be performed solely by the human mind. For example, the human mind is incapable of transforming complex metadata into high-dimensional vector embeddings that capture contextual semantics across heterogeneous data sources, nor can it dynamically classify and map thousands of events to specific document sections in near real-time. While a human can manually enter data into a document template and proofread simple documents, the present disclosure leverages computationally intensive techniques (e.g., performing high-dimensional similarity searches across millions of records, processing hundreds of thousands of data points, identifying intricate patterns, and continuously updating predictions using advanced ML techniques and statistical models in at least near real-time), thereby achieving results far beyond human capability. Moreover, the subject matter disclosed herein is not directed to organizing human activity or any conventional economic practice, but rather provides a technical solution to a problem that requires sophisticated computer technology. Specifically, various implementations of the present disclosure provide specific inventive steps to automate the population of documents about special entities using vector embedding-based classification and dynamic document mapping, thereby improving the accuracy, efficiency, and scalability of document generation in modern computer-based systems.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

FIG. 1 shows an example computing system 100, according to some implementations. Various aspects of the computing system 100 disclosed herein are generally applicable for automatically populating documents about special entities. The computing system 100 includes a combination of one or more processors 110, a memory 114 coupled to the one or more processors 110, one or more interfaces 120, an extraction module 124, one or more databases 130, an attribute database 134, a document database 138, a filtering engine 140, a transformer 150, one or more language models (LMs) 154, a preclassifier 160, a binary classifier 170, an exclusion module 178, a multi-class classifier 180, and/or a mapping engine 190. In some implementations, the various components of the computing system 100 are interconnected by at least a data bus 198. In some other implementations, the various components of the computing system 100 are interconnected using other suitable signal routing resources.

The processor 110 includes one or more suitable processors capable of executing scripts or instructions of one or more software programs stored in the computing system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more hardware accelerators for processing a large amount of data and/or one or more artificial intelligence (AI) accelerators for accelerating AI and machine learning (ML)-based operations, such as one or more graphics processing units (GPUs), one or more tensor processing units (TPUs), one or more neural processing units (NPUs), a wafer-scale integration (WSI) architecture, or the like. For example, the processor 110 may use hardware-based TPUs to process and/or adjust millions, billions, or trillions of artificial neural network (ANN) parameters within seconds, milliseconds, or microseconds.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

One or more input/output (I/O) interfaces (e.g., the interface 120) may be used for transmitting or receiving (e.g., over a communications network, such as the Internet or an intranet) transmissions, input data, and/or instructions to or from a computing device (e.g., associated with a user of the system 100), outputting data (e.g., over the communications network) to the computing device, or the like. The interface 120 may also be used to transmit communications to a user's computing device. The interface 120 may also be used to provide or receive other suitable information, such as computer code for updating one or more programs stored on the computing system 100, internet protocol requests and results, or the like. An example interface includes a wired interface or wireless interface to the Internet or other means to communicably couple with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the computing system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the computing system 100 by a local user or moderator.

Figure 2:
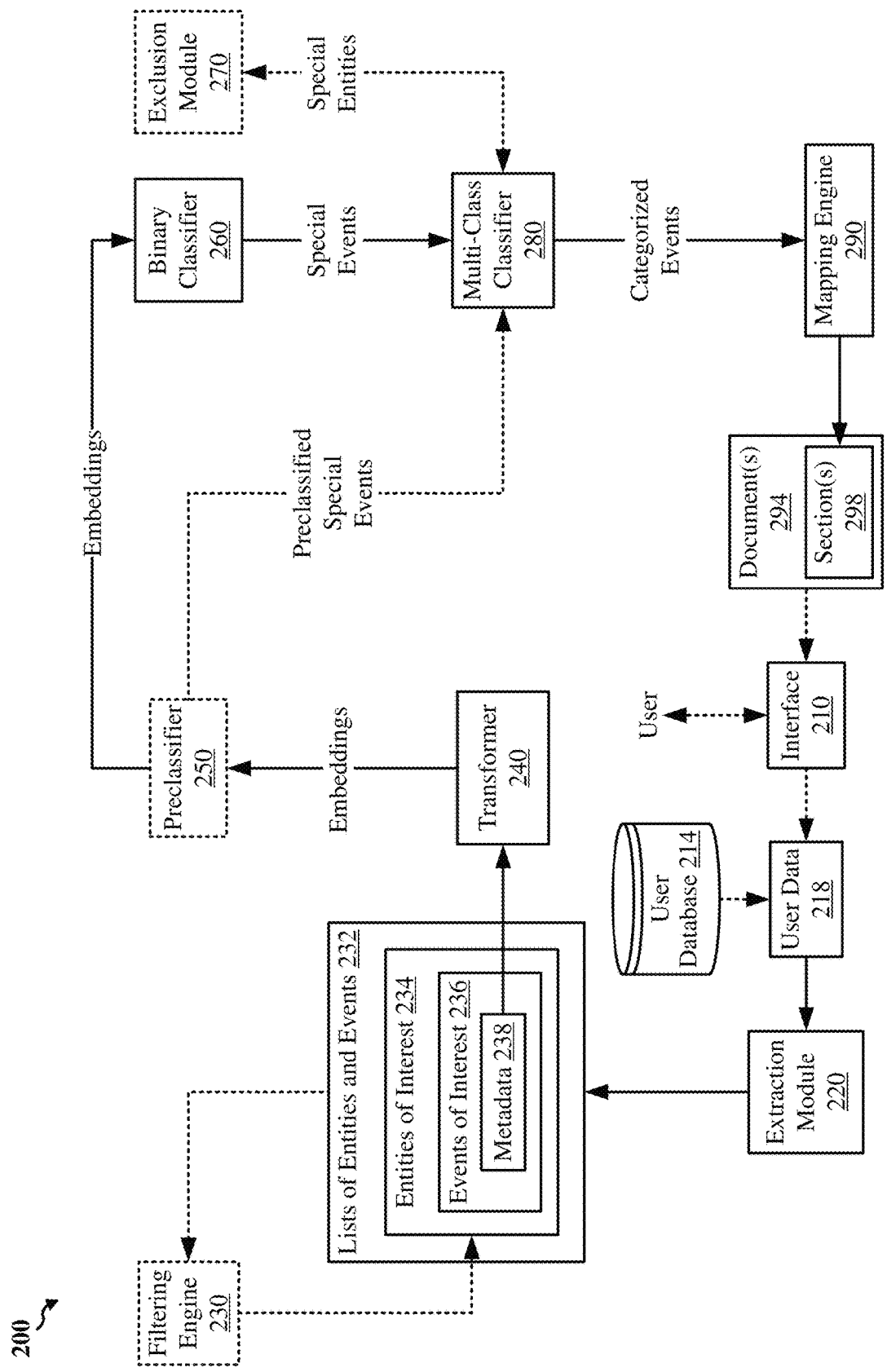
FIG. 2 shows an example process flow for automatically populating documents about special entities, according to some implementations.

The extraction module 124 may be used to extract entities and events from user data, as described at least with respect to FIG. 2.

The database 130 may store data associated with the computing system 100, such as user data, transmissions, lists, entities, events, metadata, embeddings, models, documents, categories, among other suitable information. In various implementations, the database 130 may store vectorized embeddings or other high-dimensional representations and associated feature vectors in a vector space, such as to enable efficient similarity searches, clustering, and advanced artificial intelligence (AI) analytics. In such implementations, portions of the database 130 may incorporate aspects of a vector database or be embedded in a multi-database architecture that enables proximity metrics and vector space computations. In various implementations, the database 130 may store datasets, features, instances, attributes, values, variables, scores, degrees or measures (or other suitable quantities), decision trees, engines, classifiers, predictions, formulas, metrics, input, output, queries, responses, requests, application information, instructions, user data, configurations, thresholds, data associated with attacks and mitigation techniques, data associated with changes, events, change data capture (CDC) information, event bus (EB) information, filters, data assets, preferences, priorities, timestamps, models, algorithms, modules, engines, user information, historical data, recent data, current or real-time data, files, plugins, arrays, tags, queries, feedback, formats, features, among other suitable information. In various implementations, the database 130 stores data associated with artificial neural network (ANN) models, such as the models themselves, untrained models, pre-trained models, tuned models, aligned models, reward models, neural network (NN) parameters (e.g., weights, biases, tensors, parameters), architectures (e.g., layer descriptions, neurons, activation functions, overall structures), training data and related information (e.g., statistics, distribution, size, preprocessing steps, training data, text corpora, tuning data, alignment data, alignment data snapshots, alignment preferences, metric logs, accuracies, loss functions and values), hyperparameters (e.g., learning rates, batch sizes, numbers of epochs), evaluation results (e.g., performance metrics and models, validation data, test sets, benchmark scores, thresholds, receiver operating characteristic (ROC) curves, confusion matrices), versioning information (e.g., iterations, updates), metadata and documentation (e.g., usage instructions, authors), deployment configurations (e.g., settings for deploying models in different environments), monitoring data (e.g., real-time or periodic tracking performance in production), or any other suitable data related to ANN models. In various implementations, the database 130 may store data in one or more cloud object storage services, such as one or more Amazon Web Services (AWS)-based Simple Storage Service (S3) buckets. In various implementations, the database 130 incorporates aspects of a database management system (DBMS) or a relational DBMS (RDBMS). In various implementations, the data may be stored in one or more JavaScript Object Notation (JSON) files, comma-separated values (CSV) files, or any other suitable data objects for processing by the computing system 100. In some implementations, the data may be stored in one or more Structured Query Language (SQL) compliant datasets for filtering, querying, and sorting, or any other suitable format for processing by the computing system 100. In various implementations, the database 130 includes a relational database capable of presenting information as datasets in tabular form and capable of manipulating the datasets using relational operators.

Figure 4:
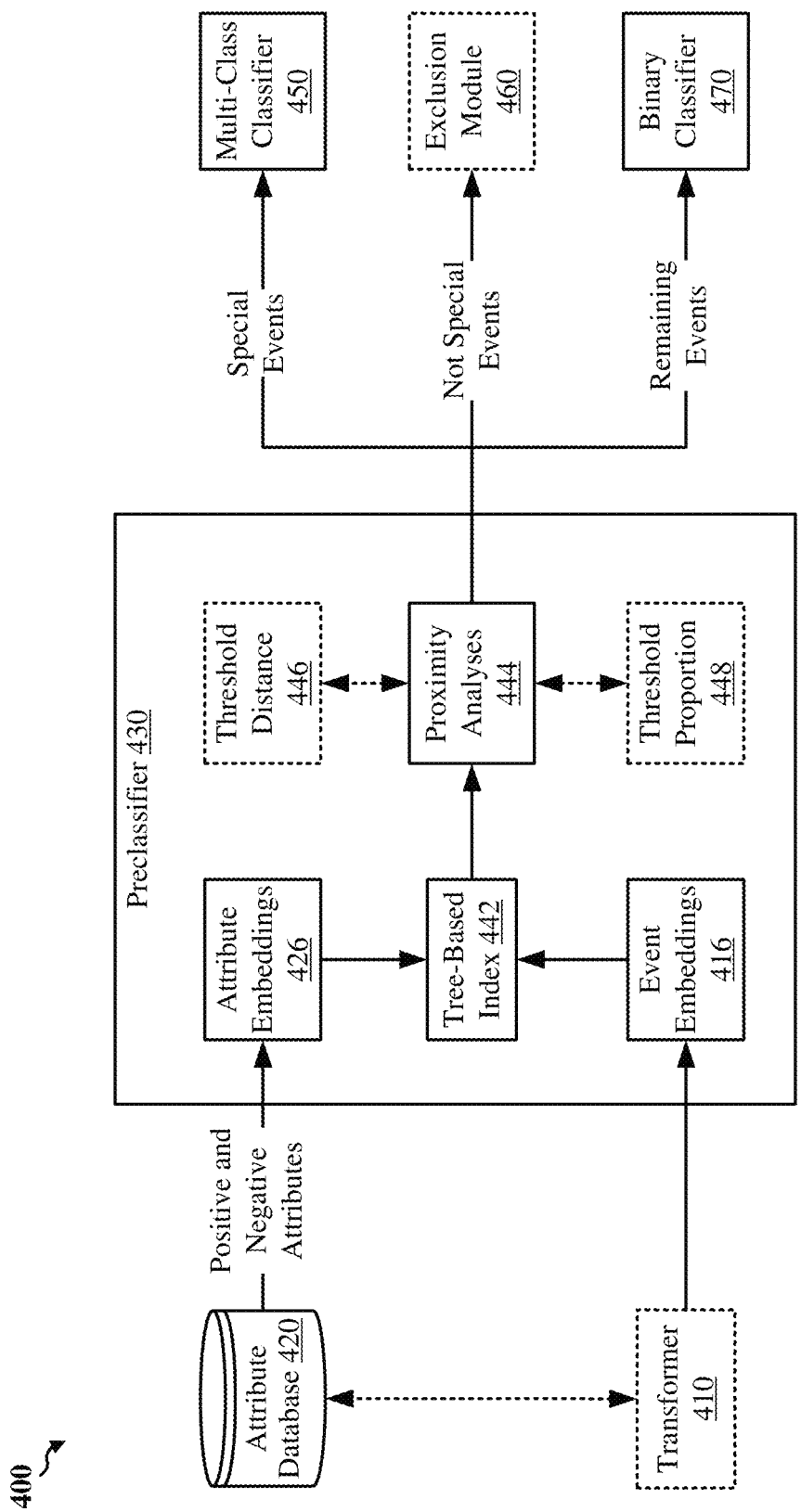
FIG. 4 shows an example process flow for preclassifying events, according to some implementations.

The attribute database 134 may store data associated with attributes, such as event attributes, predefined attributes, positive attributes, negative attributes, vectorized attributes, or the like, as described at least with respect to FIG. 4. In some implementations, the attribute database 134 is one of a plurality of databases managed by the database 130. The attribute database 134 may incorporate aspects of a relational database (e.g., MySQL, PostgreSQL, SQLite), a vector search engine, or another suitable database for structured user data management and/or high-dimensional vector similarity search.

Figure 5:
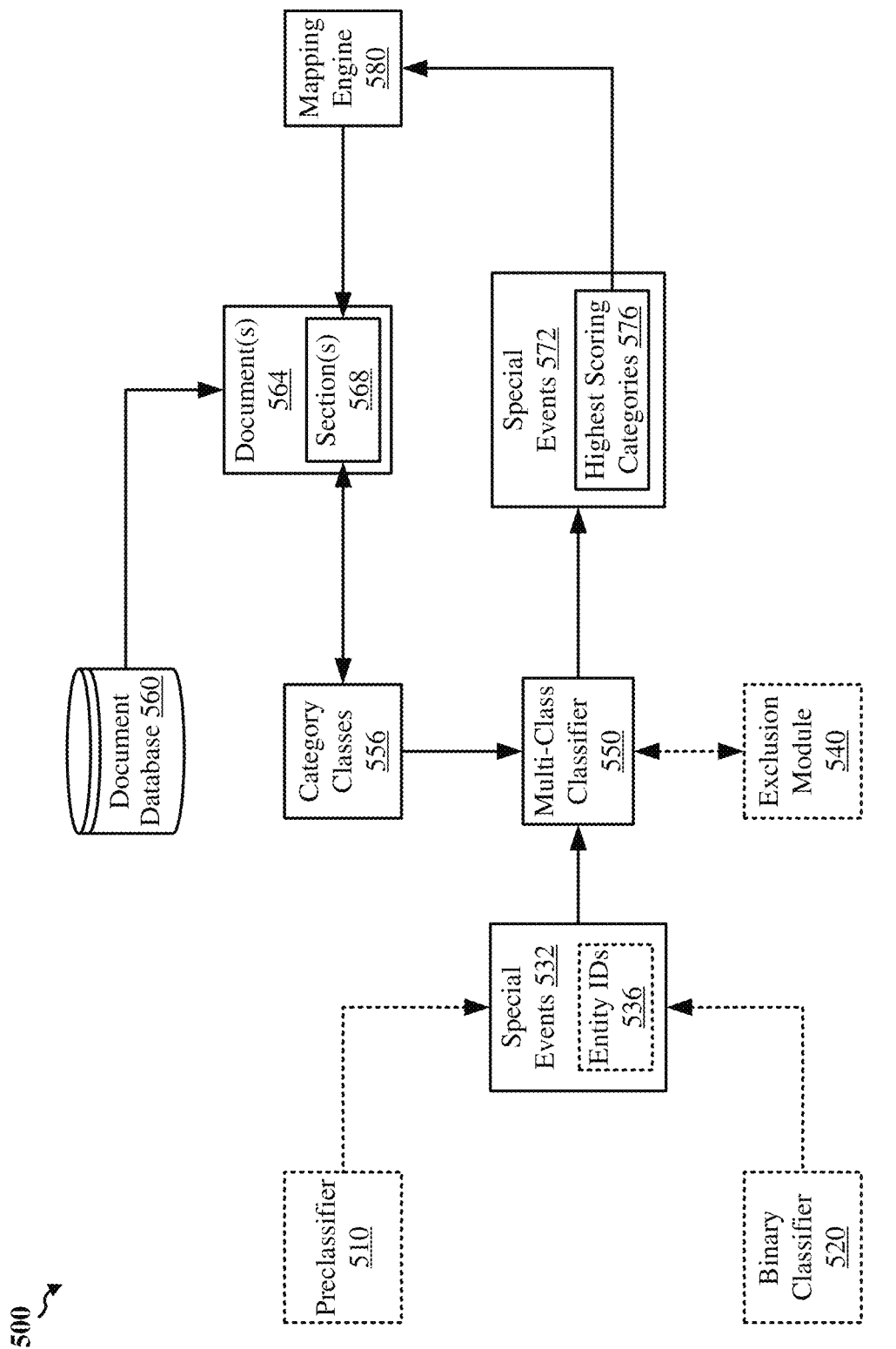
FIG. 5 shows an example process flow for assigning special events to document sections.

The document database 138 may store data associated with documents, such as the documents themselves, document sections, populated documents, document guidelines, or the like, as described at least with respect to FIG. 5. In some implementations, the document database 138 is one of a plurality of databases managed by the database 130. The document database 138 may incorporate aspects of a relational database (e.g., MySQL, PostgreSQL, SQLite), a vector search engine, or another suitable database for structured user data management and/or high-dimensional vector similarity search.

Figure 3:
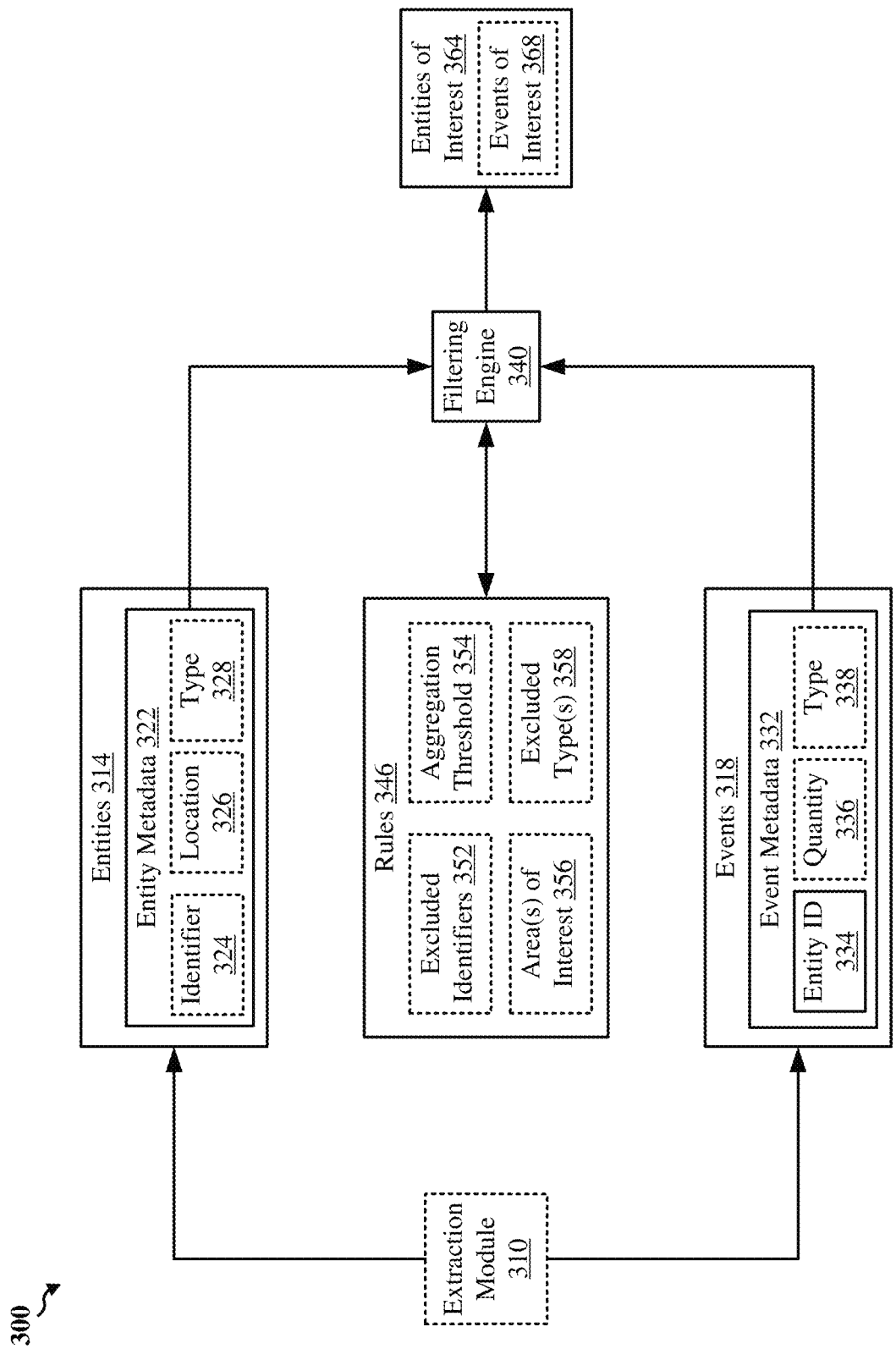
FIG. 3 shows an example process flow for identifying entities of interest, according to some implementations.

The filtering engine 140 may be used to identify entities of interest, as described at least with respect to FIGS. 2-3.

The transformer 150 may be used to generate feature vectors from sets of features and/or attributes, as described at least with respect to FIG. 2. In some implementations, the transformer 150 is a sentence transformer, such as a language model (LM) fine-tuned using a sentence transforming learning technique (e.g., contrastive learning, Siamese network training, triplet loss, cosine similarity loss), so that the feature vectors incorporate semantic meaning and context from the sets of features and/or attributes.

The one or more LMs 154 may be any suitable generative AI model trained on a large corpus of text to generate written responses, answer questions, translate language, and/or assist with various natural language processing (NLP)-based tasks. In some implementations, the one or more LMs 154 include at least the transformer 150. In various implementations, the LM 154 may be a large language model (LLM) or a multimodal large language model (MLLM). In various implementations, the LM 154 is integrated directly into one or more applications (not shown for simplicity) associated with the computing system 100 or as a separate service. For example, the one or more applications may each include one or more interconnected modules or components that interact with each other to perform one or more functions or tasks, such as providing a desired functionality to a user (e.g., automatically populating documents for a user in real-time with receiving user data at the computing system 100). In various implementations, the application integrates aspects of ML, deep learning (DL), or AI to provide predictive capabilities, personalized recommendations, decision-making automation, or the like. In various implementations, the application may have a monolithic architecture, a microservices architecture including a plurality of services coupled via one or more application programming interfaces (APIs), and/or a distributed architecture across a plurality of processes and/or machines and network protocols. In various implementations, the application may integrate with one or more external systems or services (e.g., via APIs) to enable the application to interact with one or more third-party gateways, services, or platforms. In various implementations, the application may be deployed on a variety of hardware platforms, mobile devices, embedded systems, or cloud servers, and may incorporate one or more CPUs, GPUs, FPGAs, sensors, or other specialized hardware and/ or AI-based accelerators to optimize performance for specific tasks. Some non-limiting example application tasks may include data processing, data analytics, fraud detection, transaction analysis, model simulation, static communication, real-time communication, collaboration, project management, entertainment, streaming, gaming, or any other suitable application task. In various implementations, the application may be developed based on a variety of programming languages and frameworks, such as Python, Node.js, Java, React.js, Angular, Flutter, or another suitable language or framework. In various implementations, the application is hosted on a cloud platform (e.g., Amazon Web Services (AWS) or Azure) and/or an on-premise infrastructure (e.g., the database 130). In various implementations, the application incorporates one or more security mechanisms, such as an authentication mechanism (e.g., multi-factor authentication (MFA)), data encryption (e.g., in transit and at rest), audit logging, an AI firewall, or the like. In various implementations, the LM 154 may receive requests (e.g., from the one or more applications), and may provide responses (e.g., to the one or more applications). In various implementations, the LM 154 may be embedded within one or more of the applications, the LM 154 may be hosted externally (e.g., accessed via APIs or cloud-based services) and in direct communication with one or more of the applications, or the LM 154 may be hosted externally and in indirect communication with the at least one application (e.g., via an intermediate service, application, or system, such as an AI firewall). In various implementations, the LM 154 may use various AI accelerators to process vast amounts of textual data (e.g., from the Internet), integrate with one or more ANNs with millions to billions or even trillions of weights or parameters, use self-supervised and/or semi-supervised training methods, incorporate aspects of the transformer architecture and/or mixture of experts (MoE), operate in part based on predicting a next token or word from an input, perform various NLP tasks, and/or include multiple layers of transformer blocks configured using aspects of deep learning to recognize and generate language patterns by processing the vast amounts of textual data using the billions or even trillions of parameters or weights. Example LMs may include OpenAI's ChatGPT, Google's Gemini, Meta's LLaMa, BigScience's BLOOM, Baidu's Ernie, Anthropic's Claude, or another suitable type of ML-based neural network compatible with prompting techniques.

The preclassifier 160 may be used to selectively preclassify events as special events, as described at least with respect to FIGS. 2 and 4.

The binary classifier 170 may be used to selectively classify entities as special entities and/or to selectively classify events as special events, as described at least with respect to FIGS. 2 and 4. In some implementations, the binary classifier 170 is a random forest model. In some aspects, the binary classifier 170 is trained using labeled events in conjunction with a random forest learning technique, such as a bootstrap aggregation technique, a random subspace technique, a decision tree technique, or the like. The binary classifier 170 may be trained to predict whether a new entity is a special entity (e.g., for a set of documents) and/or whether a new event is a special event (e.g., for the set of documents). In some implementations, training the binary classifier model may include extracting features from textual content and metadata of the documents, such as contextual keywords, document frequency, sentiment indicators, and/or temporal or relational data. The extracted features may be used to generate training data where known entities and events are labeled as "special" or "not special" based on selected criteria. The training data may be used in conjunction with a random forest algorithm to generate robust decision trees for the binary classifier model to use in its predictions.

The exclusion module 178 may be used to selectively exclude special entities based on special events, as described at least with respect to FIG. 5.

The multi-class classifier 180 may be used to assign categories to special events, as described at least with respect to FIGS. 2 and 4-5. In some implementations, the multi-class classifier 180 is a random forest model trained, using labeled events in conjunction with a random forest learning technique, to predict which of a plurality of classes most closely matches a given event. In some implementations, the multi-class classifier 180 is trained to assign each special event associated with a special entity to one of a predefined set of categories, where each category maps to a corresponding section within a set of documents. In some implementations, training the multi-class classifier 180 includes generating vectorized embeddings from the textual content and metadata of the documents, thereby capturing contextual keywords and semantic associations in the unstructured data and transforming it into numerical representations that the multi-class classifier 180 can process. The extracted embeddings and other features may be used to generate training data for the multi-class classifier 180 where special events are pre-assigned to particular categories. In some implementations, the multi-class classifier 180 is iteratively retrained to generate predictions based on revised guidelines. For instance, the iterative retraining may include feeding the revised guidelines and historical guidelines previously used to train the multi-class classifier 180 to an LM, using an output of the LM to identify one or more changes in the guidelines, generating updated trained data for the multi-class classifier 180 based on the identifies changes in the guidelines, and retraining the multi-class classifier 180 using the updated training data.

The mapping engine 190 may be used to populate sections within documents based on assigned categories, as described at least with respect to FIGS. 2 and 5.

The extraction module 124, the database 130, the attribute database 134, the document database 138, the filtering engine 140, the transformer 150, the LM 154, the preclassifier 160, the binary classifier 170, the exclusion module 178, the multi-class classifier 180, and the mapping engine 190, are implemented in software, hardware, or a combination thereof. In some implementations, any one or more of the extraction module 124, the database 130, the attribute database 134, the document database 138, the filtering engine 140, the transformer 150, the LM 154, the preclassifier 160, the binary classifier 170, the exclusion module 178, the multi-class classifier 180, or the mapping engine 190, is embodied in instructions that, when executed by the processor 110, cause the computing system 100 to perform operations. In various implementations, the instructions of one or more of said components and/or the interface 120 are stored in the memory 114, the database 130, or a different suitable memory, and are in any suitable programming language format for execution by the computing system 100, such as by the processor 110. It is to be understood that the particular architecture of the computing system 100 shown in FIG. 1 is but one example of a variety of different architectures within which aspects of the present disclosure can be implemented. For example, in some implementations, components of the computing system 100 are distributed across multiple devices, included in fewer components, and so on. While the below examples related to automatically populating documents about special entities are described with reference to the computing system 100, other suitable system configurations may be used.

FIG. 2 shows an example process flow 200 for automatically populating documents about special entities, according to some implementations, and may be performed by one or more processors of a computing system, such as the computing system 100 described with respect to FIG. 1. The example process flow 200 shows an interface 210, a user database 214, an extraction module 220, a filtering engine 230, a transformer 240, a preclassifier 250, a binary classifier 260, an exclusion module 270, a multi-class classifier 280, and a mapping engine 290, which may be examples of the interface 120, the database 130, the extraction module 124, the filtering engine 140, the transformer 150, the preclassifier 160, the binary classifier 170, the exclusion module 178, the multi-class classifier 180, and the mapping engine 190 described with respect to FIG. 1, respectively.

The example process flow 200 starts with receiving user data 218 at the extraction module 220. The user data 218 may be associated with a user of the computing system. The user data 218 may be received via the interface 210 and/or from the user database 214. For example, the user may access the computing system 100 via the interface 210 and directly provide at least a portion of the user data 218 via the interface 210. In some instances, the portion of the user data 218 received via the interface 210 may be a request, and upon receiving the request, the computing system 100 retrieves the remaining portion of the user data 218 from the user database 214. The user that submits the request may be different than the user associated with the user data 218.

As a non-limiting example, the user data 218 may be information (e.g., stored in the user database 214) associated with the user's financial transactions that occurred during a most recent tax year, and the request may be a request (e.g., from the user's accountant) to automatically populate form 1099 documents for the user's upcoming tax filing.

The example process flow 200 continues with the extraction module 220 extracting a list of entities and events 232 from the user data 218. Each of the entities may be associated with the user, and each of the events may be an event that occurred between the user and at least one of the entities. The entities in the lists of entities and events 232 may include a subset of entities of interest 234. In some implementations, the entities of interest 234 may be manually identified by the user. In some other implementations, the entities of interest 234 may be automatically identified using the filtering engine 230. For example, the filtering engine 230 may identify the entities of interest 234 within the list of entities and events 232 based on metadata 238, as further described in connection with FIG. 3. The events associated with the entities of interest 234 may be referred to as events of interest 236. Although all of the entities and events included in the lists of entities and events 232 may be associated with metadata, the metadata 238 of FIG. 2 may be any metadata associated with any of the entities of interest 234 or the events of interest 236.

Continuing the non-limiting example above, the events in the lists of entities and events 232 may be financial transactions that occurred between the user and various entities during the most recent tax year, the entities in the lists of entities and events 232 may be recipients associated with the user's financial transactions, and an entity of interest may be vendors or contractors among the recipients (e.g., because a form 1099 is used to report payments made to non-employees).

The example process flow 200 continues with the transformer 240 transforming the metadata 238 for the events of interest 236 into vectorized embeddings in a vector space. In some implementations, transforming the metadata 238 into the embeddings includes extracting a set of features and attributes for each event of interest 236 based on the metadata 238, generating feature vectors from the sets of features and attributes, and embedding the feature vectors in the vector space. The transformer 240 may incorporate aspects of a sentence transformer, such as a language model (LM) fine-tuned using a sentence transforming learning technique, thereby enabling efficient and accurate generation of meaningful sentence embeddings. In this manner, the feature vectors may incorporate semantic meaning and context from the sets of features and attributes.

Continuing the non-limiting example above, the metadata 238 may be any information associated with the vendors and corresponding transactions, and the features and attributes may be extracted from free form text in the user's chart of accounts (e.g., account name, vendor name, memo text, and transaction type).

In some implementations, the example process flow 200 continues with providing the vectorized embeddings (and/or access to the vector space in which the vectorized embeddings are embedded) to the preclassifier 250. In such implementations, the preclassifier 250 may selectively preclassify the transformed events of interest 236 as special events for the documents 294 and provide the preclassified special events to the multi-class classifier 280. The preclassifier 250 may perform the selective preclassification using a set of predefined attributes in conjunction with a nearest neighbor technique, as further described in connection with FIG. 4.

Continuing the non-limiting example above, a special event may be one of the user's financial transactions that is relevant to any form 1099 document, where the documents include one or more form 1099 document types, such as 1099-NEC, 1099-MISC, 1099-INT, 1099-DIV, 1099-G, and so on.

The example process flow 200 continues with providing the vectorized embeddings (and/or access to the vector space in which the vectorized embeddings are embedded) to the binary classifier 260. For implementations in which the preclassifier 250 selectively preclassifies ones of the events, the computing system 100 may refrain from providing the embeddings associated with the preclassified events to the binary classifier 260. Using the vectorized embeddings in conjunction with a trained binary classifier model, the binary classifier 260 may selectively classify the entities of interest 234 as special entities and/or the events of interest 236 as special events. The binary classifier model may be a trained random forest model. For example, using labeled events associated with labeled entities in conjunction with a random forest learning technique, the random forest model may be trained to predict whether a new entity is a special entity for the documents 294 and/or whether a new event is a special event for the set of documents 294. In some instances, the random forest model for the binary classifier 260 is fine-tuned to prioritize recall over precision, thereby resulting in maximizing the capture of potential true positives.

Continuing the non-limiting example above, the labeled events may be historical tax documents filed by accountants where vendors are labeled to indicate whether they received a form 1099 and transactions are labeled to indicate whether they were mapped to a form 1099 box, a special entity may be a vendor deemed by the computing system 100 to need a form 1099, and prioritizing recall for the binary classifier 260 can prevent the computing system 100 from missing 1099 transactions for the user's review while favoring the user's manual removal of false positives (e.g., during an approval process).

In some implementations, the example process flow 200 continues with the exclusion module 270 selectively excluding ones of the special entities based on the special events. For example, each of the events of interest 236 that is classified as a special event (e.g., by the binary classifier 260 or the preclassifier 250) may be associated with one of the entities of interest 234, such as based on entity identifiers in the metadata 238. Such entities of interest 234 may be referred to as "special entities," some of which may be excluded by the exclusion module 270. Specifically, for each special entity, the exclusion module 270 may retrieve the special events associated with the special entity, generate an aggregation metric based on the retrieved special events, and selectively exclude the special entity based on whether the aggregation metric exceeds a threshold, as further described in connection with FIG. 5.

Continuing the non-limiting example above, an excluded special entity may be a vendor that is deemed relevant for a form 1099 but that the computing system 100 determines is not associated with a total amount of payments from the user that exceed $600 (i.e., in accordance with IRS regulations).

The example process flow 200 continues with providing the special events to the multi-class classifier 280. For implementations in which the exclusion module 270 selectively excludes ones of the special entities, the computing system 100 may refrain from providing the multi-class classifier 280 with the special events associated with the excluded special entities. Using the vectorized embeddings in conjunction with a trained multi-class classifier model, the multi-class classifier 280 may assign one of a plurality of categories to each special event. The multi-class classifier 280 may be a trained random forest model. For example, using labeled events in conjunction with a random forest learning technique, the random forest model may be trained to predict which of a plurality of classes most closely matches a given event, where each of the classes (or "categories") maps to a corresponding one of the sections 298 within the documents 294, as further described in connection with FIG. 5.

Continuing the non-limiting example above, the labeled events used to train the multi-class classifier 280 may be historical form 1099 documents filed by accountants, where each transaction is labeled to indicate to which section (or "box") in the form 1099 documents the transaction was allocated, and where each category maps to a different one of the sections within the form 1099 documents. In some implementations, the multi-class classifier 280 may be iteratively retrained to generate predictions based on revised guidelines (e.g., changing tax regulations).

The example process flow 200 continues with providing the categorized events to the mapping engine 290. For each remaining special entity, the mapping engine 290 may populate the corresponding sections 298 within the set of documents 294 based on the categories assigned to the special entity's special events, as further described in connection with FIG. 5.

In some implementations, the example process flow 200 continues with presenting and/or providing the documents 294 and/or the populated sections 298 (e.g., to the user) via the interface 210. In some instances, the presenting and/or providing is performed in at least near real-time with the receiving of the user data 218. In some other instances, even if the sections 298 are populated in at least near real-time, the computing system 100 may present a progress visualization via the interface 210 for a minimum amount of time prior to presenting and/or providing the documents 294. In addition, or in the alternative, the computing system 100 may generate a summary including information about the special entities, the special events, the populated sections 298, or the documents 294. In some instances, the summary includes a plain text reasoning for one or more of the classifications of the special entities and/or the special events. The summary may be generated in at least near real-time with the receiving of the user data 218 and may be presented via the interface 210 after the presentation of a progress visualization. In some implementations, the computing system 100 presents the summary to the user along with an option to modify at least one of the special entities, special events, documents 294, and/or populated sections 298. In such implementations, upon receiving one or more modifications from the user, the computing system 100 may regenerate the summary and present the regenerated summary to the user. In some implementations, the computing system 100 may request an approval from the user of one or more of the special entities, the special events, the documents 294, the populated sections 298, or the summary. In such implementations, the sections 298 may be populated within the documents 294 upon receiving the user's approval. In some other implementations, the computing system 100 may refrain from providing the documents 294 to the user. In such implementations, the documents 294 may be provided to the corresponding remaining special entities (e.g., based on their metadata), where each remaining special entity is sent the ones of the documents 294 that are populated based on the special entity's special events. In addition, or in the alternative, the populated documents 294 may be provided to one or more higher level entities.

Continuing the non-limiting example above, the plain text reasoning may be a statement that a particular vendor was not recommended for a form 1099 document because the payments made by the user to the particular vendor did not exceed $600 (i.e., in accordance with IRS regulations). Furthermore, providing the documents 294 to the special entities may include initiating the mailing of a hard copy (or a transmission) of each form 1099 document to the appropriate vendor associated with the user, and providing the documents 294 to the higher level entities may include initiating the mailing of a hard copy (or a transmission) of each form 1099 document to the IRS and/or the applicable states in which the associated vendors are located.

FIG. 3 shows an example process flow 300 for identifying entities of interest, according to some implementations, and may be performed by one or more processors of a computing system, such as the computing system 100 described with respect to FIG. 1. The example process flow 300 shows an extraction module 310 and a filtering engine 340, which may be examples of the extraction module 220 and the filtering engine 230, respectively, described with respect to FIG. 2.

The example process flow 300 starts with obtaining entities 314 and events 318, which may be examples of the entities and events in the lists of entities and events 232 of FIG. 2. In some implementations, the entities 314 and the events 318 are extracted from user data, such as by the extraction module 310. The entities 314 may be associated with entity metadata 322, and the events 318 may be associated with event metadata 332. The entity metadata 322 and the event metadata 332 may be examples of the metadata 238 of FIG. 2. Examples of the entity metadata 322 include, for each respective entity of the entities 314, an identifier 324 (or "ID") for the respective entity, a location 326 of the respective entity, and a type 328 of the respective entity. The event metadata 332 for each respective event of the events 318 may include at least an entity ID 334 that maps to one of the entities 314. The entity ID 334 may be the same as the corresponding entity identifier 324, or in some implementations, different IDs may be used. Other examples of the event metadata 332 include, for each respective event of the events 318, a quantity 336 associated with the respective event and a type 338 of the respective event.

Continuing the non-limiting example described in connection with FIG. 2, the identifier 324 may be a (e.g., business) name of a payee, the location 326 may be a location (e.g., a country, a state) in which the payee is located, and the type 328 may be a type of the payee (e.g., vendor, contractor, employee). Furthermore, the entity ID 334 may be a unique ID assigned to each distinct one of the entities 314 (e.g., for purposes of managing a database), the quantity 336 may be an amount of a financial transaction, and the type 338 may be a type of the transaction (e.g., credit card, cash).

The example process flow 300 continues with providing the entities 314 and the events 318 to the filtering engine 340. The filtering engine 340 may selectively filter ones of the entities 314 using the event metadata 332 and/or the entity metadata 322 in conjunction with rules 346, which may be referred to as rule-based filters. In addition, or in the alternative, the filtering engine 340 may selectively filter ones of the events 318 using the event metadata 332 and/or the entity metadata 322 in conjunction with the rules 346. In some implementations, upon filtering a given entity from the entities 314, the filtering engine 340 may also filter the ones of the events 318 associated with the given entity. In some other implementations, a given event may be associated with more than one entity, and in such implementations, the filtering engine 340 may refrain from also filtering the associated events unless all of the associated entities are filtered.

In some example instances, the filtering engine 340 may filter (or "remove") a given entity from the entities 314 responsive to determining that the identifier 324 for the given entity appears within a list of excluded identifiers 352. In some example instances, the filtering engine 340 may filter a given entity responsive to determining that the location 326 for the given entity is outside of one or more areas of interest 356. In some example instances, the filtering engine 340 may identify (e.g., based on the entity IDs 334) the ones of the events 318 that are associated with a given entity, determine (e.g., based on the quantities 336) an aggregation metric (e.g., a sum, an average, or the like) for the identified ones of the events 318, compare the aggregation metric with an aggregation threshold 354, and filter the given entity responsive to determining that the aggregation metric does not exceed the aggregation threshold 354. In some other implementations, the filtering engine 340 may filter a given entity responsive to determining that the aggregation metric does exceed the aggregation threshold 354. In some implementations, the filtering engine 340 filters ones of the entities 314 and/or ones of the events 318 having an entity type 328 or an event type 338, respectively, included within a list of excluded types 358. In instances where ones of the events 318 are filtered, the aggregation metric may exclude the quantities for the filtered ones of the events 318—that is, the aggregation metric may be determined without using the quantities for the filtered events.

Continuing the non-limiting example above, the excluded identifiers 352 may include ones of the entity IDs associated with a predefined list of vendors known to not be suitable for receiving a form 1099, such as corporations (i.e., in accordance with IRS guidelines) or other vendors previously identified as not suitable for a form 1099. Furthermore, the aggregation metric may be a sum of payments made by the user to the vendor, where the aggregation threshold 354 may be $600 (i.e., in accordance with IRS guidelines). Furthermore, the area of interest 356 may be the United States, where entities located outside of the United States may not be suitable for receiving a form 1099 (i.e., in accordance with IRS guidelines). Furthermore, the excluded type 358 may be a credit card payment (i.e., in accordance with IRS guidelines).

The example process flow 300 continues with identifying the remaining (i.e., non-filtered) ones of the entities 314 as entities of interest 364. In some implementations, the remaining (i.e., non-filtered) ones of the events 318 associated with the entities of interest 364 may be considered events of interest 368. The entities of interest 364 and the events of interest 368 may be examples of the entities of interest 234 and the events of interest 236, respectively, described with respect to FIG. 2.

FIG. 4 shows an example process flow 400 for preclassifying events, according to some implementations, and may be performed by one or more processors of a computing system, such as the computing system 100 described with respect to FIG. 1. The example process flow 400 shows a transformer 410, an attribute database 420, a preclassifier 430, a multi-class classifier 450, an exclusion module 460, and a binary classifier 470, which may be examples of the transformer 240, the attribute database 134, the preclassifier 250, the multi-class classifier 280, the exclusion module 270, and the binary classifier 260, respectively, described with respect to FIGS. 1-2.

The example process flow 400 starts with obtaining event embeddings 416 and attribute embeddings 426 at the preclassifier 430. In some implementations, the event embeddings 416 are obtained from the transformer 410. The attribute embeddings 426 may be obtained from the attribute database 420. In some aspects, obtaining the event embeddings 416 and/or the attribute embeddings 426 at the preclassifier 430 may include accessing a vector space associated with the attribute database 420. For example, the attribute embeddings 426 may be generated by the transformer 410 based on vectorizing predefined attributes that are embedded in the vector space. In some implementations, the predefined attributes include predefined positive attributes suggestive of an event being a special event and predefined negative attributes suggestive of an event not being a special event.

Continuing the non-limiting example described in connection with FIGS. 2-3, a positive attribute may be text in a memo of a transaction stating "legal fees," thereby indicative of the transaction being for the payment of legal fees and suggestive of a transaction suitable for inclusion on a form 1099 (i.e., in accordance with IRS guidelines). By contrast, a negative attribute may be text in a memo of a transaction stating "employee wages," thereby indicative of the transaction being for the payment of employee wages and suggestive of a transaction not being suitable for inclusion on a form 1099 (i.e., in accordance with IRS guidelines).

The example process flow 400 continues with generating a tree-based index 442 based on the event embeddings 416 and the attribute embeddings 426. For instance, the tree-based index 442 may be a hierarchical data structure that enables efficient identification of nearby embeddings, where the hierarchical data structure is generated using the embeddings in conjunction with a tree building technique (e.g., KD-tree, ball tree, RP-tree). Thereafter, the preclassifier 430 may perform a set of proximity analyses 444 using an approximate nearest-neighbor (ANN) technique in conjunction with the tree-based index 442. Specifically, for each respective event associated with the event embeddings 416, the preclassifier 430 may perform an ANN analysis of the respective event's "neighbors" (if any) in the tree-based index 442, and selectively preclassify the respective event based on results of the ANN analysis. Ones of the events that are preclassified as "special" may be sent to the multi-class classifier 450 for additional classification, ones of the events that are preclassified as "not special" may be sent to the exclusion module 460 or otherwise filtered from further processing, and ones of the events that are not preclassified (i.e., the "remaining events") may be sent to the binary classifier 470 for classification.

For example, the preclassifier 430 may determine whether a respective event has one or more neighbors in the tree-based index 442 within a threshold distance 446. In some examples, responsive to determining that the respective event does have one or more neighbors in the tree-based index within the threshold distance 446, the preclassifier 430 may proceed to selectively preclassify the respective event. In such examples, the preclassifier 430 may determine a proportion of the neighbors within the threshold distance 446 that are associated with the positive attributes, and determine a proportion of the neighbors within the threshold distance 446 that are associated with the negative attributes.

Thereafter, the preclassifier 430 may preclassify the respective event as a special event when more than a threshold proportion 448 of the neighbors within the threshold distance 446 are associated with the positive attributes, or the preclassifier 430 may preclassify the respective event as not a special event when more than the threshold proportion 448 of the neighbors within the threshold distance 446 are associated with the negative attributes. In other instances, the preclassifier 430 may determine that the neighbors within the threshold distance 446 do not exceed the threshold proportion 448 with respect to the positive attributes or the negative attributes, and in such instances, the preclassifier 430 may refrain from preclassifying the respective event and instead submit the respective event to the binary classifier 470. In some other examples, responsive to determining that the respective event does not have one or more neighbors in the tree-based index within the threshold distance 446, the preclassifier 430 may refrain from preclassifying the respective event and submit the respective event to the binary classifier 470.

In some implementations, a safety engine (not shown) may selectively reclassify ones of the events preclassified by the preclassifier 430. Specifically, the safety engine may generate a safety score for each preclassified event output from the preclassifier 430, and determine whether any of the preclassifications are to be reclassified based on the safety scores. Reclassifying a given event may include reversing the preclassification for the given event (e.g., reclassifying a "special" event as a "not special" event, or vice versa) or removing the preclassification and submitting the given event to the binary classifier 470 for classification. In some implementations, the safety engine may reverse the preclassification when the safety score for the given event indicates (e.g., based on a confidence threshold) that the preclassification assigned by the preclassifier 430 may be inappropriate and indicates (e.g., based on a confidence threshold) that the opposite classification may be appropriate. In some other implementations, the safety engine may simply remove the preclassification when the safety score for the given event indicates (e.g., based on a confidence threshold) that the preclassification assigned by the preclassifier 430 may be inappropriate or indicates (e.g., based on a confidence threshold) that the opposite classification may be appropriate, and the unclassified event may be submitted to the binary classifier 470 for classification.

For example, the safety engine may generate each safety score based on an edit distance. For instance, a first set of bigrams may be generated from a set of positive event attributes (which may be the positive attributes discussed above or a different set of positive attributes) indicative of an event being a "special" event, and a second set of bigrams may be generated from a set of negative event attributes (which may be the negative attributes discussed above or a different set of negative attributes) indicative of an event being a "not special" event. Thereafter, for each given preclassified event, the safety engine may generate a third set of bigrams based on the metadata associated with the given preclassified event, such as the event metadata 332 of FIG. 3 among any other metadata associated with the event. The safety engine may then determine, for each respective bigram in the third set of bigrams, an edit distance between the respective bigram and each bigram in the first and second sets of bigrams. In some implementations, the edit distance may be a Levenshtein distance, such as when efficiency is a priority. In some other implementations, the edit distance may be a Damerau-Levenshtein distance, a Hamming distance, a Jaro-Winkler distance, a Longest Common Subsequence (LCS) distance, an Optimal String Alignment distance, or another suitable metric. For example, the safety score for an event preclassified as "special" may be below a confidence threshold when at least one bigram (or any other suitable number or proportion of bigrams) in the third set of bigrams has an edit distance below a safety threshold with at least one of the bigrams (or any other suitable number or proportion of bigrams) in the second set of bigrams, thereby indicating that the "not special" classification may (e.g., also) be appropriate. As another example, the safety score for an event preclassified as "not special" may be below a confidence threshold when at least one bigram (or any other suitable number or proportion of bigrams) in the third set of bigrams has an edit distance below a safety threshold with at least one of the bigrams (or any other suitable number or proportion of bigrams) in the first set of bigrams, thereby indicating that the "special" classification may (e.g., also) be appropriate.

FIG. 5 shows an example process flow 500 depicting an example operation for assigning special events to document sections, according to some implementations, and may be performed by one or more processors of a computing system, such as the computing system 100 described with respect to FIG. 1. The example process flow 500 shows a preclassifier 510, a binary classifier 520, an exclusion module 540, a multi-class classifier 550, and a mapping engine 580, which may be examples of the preclassifier 430, the binary classifier 470, the exclusion module 460, the multi-class classifier 450, and the mapping engine 290, respectively, described with respect to FIGS. 2 and 4.

The example process flow 500 starts with providing special events 532 to the multi-class classifier 550. The special events 532 may be an example of the special events described in connection with FIG. 4. Each of the special events 532 may be associated with the metadata (e.g., the event metadata 332 of FIG. 3), which may include at least an entity identifier (ID) 536 mapping the special event to one of a plurality of entities. In various implementations, the special events 532 may be obtained from the preclassifier 510 and/or the binary classifier 520. For example, some of the special events 532 may be obtained from the preclassifier 510 having been preclassified as "special" events as described in connection with FIG. 4, and the remaining special events 532 may be obtained from the binary classifier 520 having not been preclassified by the preclassifier 430 (or having been unclassified by the safety engine) and subsequently classified as "special" events by the binary classifier 520.

In some implementations, the exclusion module 540 prevents the multi-class classifier 550 from assigning a category to ones of the special events 532 upon a determination that the entity associated with the events is not special. For instance, a given entity may be deemed as not special if an aggregation metric determined based on the (e.g., quantities associated with the) special events for the given entity does not exceed a threshold. In such instances, the given entity (and the events associated with the given entity) may be excluded from classification by the multi-class classifier 550 (e.g., and thus excluded from the documents 564).

Continuing the non-limiting example described in connection with FIGS. 2-4, the special events may be transactions associated with the special entity (vendor) that are deemed to be suitable for reporting on a form 1099, the aggregation metric may be a sum of the transactions, the threshold may be $600 (i.e., in accordance with IRS guidelines), and excluding the given entity may include refraining from generating any form 1099 documents for that vendor.

The example process flow 500 continues with the multi-class classifier 550 assigning one of a plurality of category classes 556 to each of the remaining special events. Each of the category classes 556 may map to a corresponding one of a plurality of sections 568 of a plurality of documents 564, where the documents 564 and the sections 568 may be examples of the documents 294 and the sections 298, respectively, described in connection with FIG. 2, and the documents 564 may be obtained from the document database 560. Specifically, the multi-class classifier 550 may be trained to predict which of the category classes 556 most closely matches each remaining special event, thereby determining a highest scoring category 576 for each of the remaining special events 572. For example, the multi-class classifier 550 may assign one of the category classes 556 to a given special event based on generating a confidence score for each respective category class of the category classes 556, where each confidence score indicates an extent to which the given special event is predicted to match the respective one of the category classes 556, and select the one of the category classes 556 with the highest confidence score as the predicted classification.

The example process flow 500 continues with providing the special events 572 and the highest scoring categories 576 to the mapping engine 580. The mapping engine 580 may identify the special entities that are associated with the special events 572 (e.g., based on the entity IDs 536). Thereafter, the mapping engine 580 may populate one or more of the documents 564 for each of the identified entities. Specifically, for each respective entity of the identified entities, the mapping engine 580 may identify a list of the highest scoring categories 576 assigned to the ones of the special events 572 associated with the respective entity. Thereafter, for each respective entity, the mapping engine 580 may map each category in the list of the highest scoring categories 576 identified for the respective entity to the corresponding one of the sections 568, thereby identifying a relevant set of documents for the respective entity (i.e., the one or more documents that include the corresponding ones of the sections 568). In some instances, each of the mapped sections 568 for the respective entity may appear in a same one of the documents 564. In some other instances, the mapped sections 568 for the respective entity may appear across a plurality of the documents 564.

Upon determining the relevant set of the documents 564 for the respective entity, the mapping engine 580 populates the corresponding sections 568 within the relevant set of documents 564 based on the highest scoring categories 576 assigned to the ones of the special events 572 associated with the respective entity. In some implementations, the mapped sections 568 may be populated based on the metadata associated with the corresponding special events 572. In some instances, the mapping engine 580 populates the one of the sections 568 mapped to a given special event 572 with a quantity indicated within the metadata associated with the given special event 572. In some of such instances, the mapping engine 580 determines that two or more of the special events 572 are mapped to a same one of the sections 568 for the respective entity. In such instances, the mapping engine 580 may generate an aggregation metric for the same one of the sections 568 based on the quantities associated with the two or more special events 572, and populate the same one of the sections 568 based on the aggregation metric.

Continuing the non-limiting example above, the populated sections may span across multiple form 1099 documents (or may all appear within a single form 1099 document for ones of the special entities), and the aggregation metric may be a sum of the transactions that are assigned to a particular form 1099 section (or "box").

It is to be understood that, even though some of the non-limiting examples described in connection with FIGS. 2-5 relate to the financial domain, the systems and methods may be applied to any domain in which automatically populating documents about special entities can provide a practical application, such as a customer relationship management (CRM) system domain, a help desk or customer support system domain, a project management domain, a social media or communication platform domain, a website or application activity tracking domain, a security or access log domain, a gaming platform domain, among others.

Figure 6:
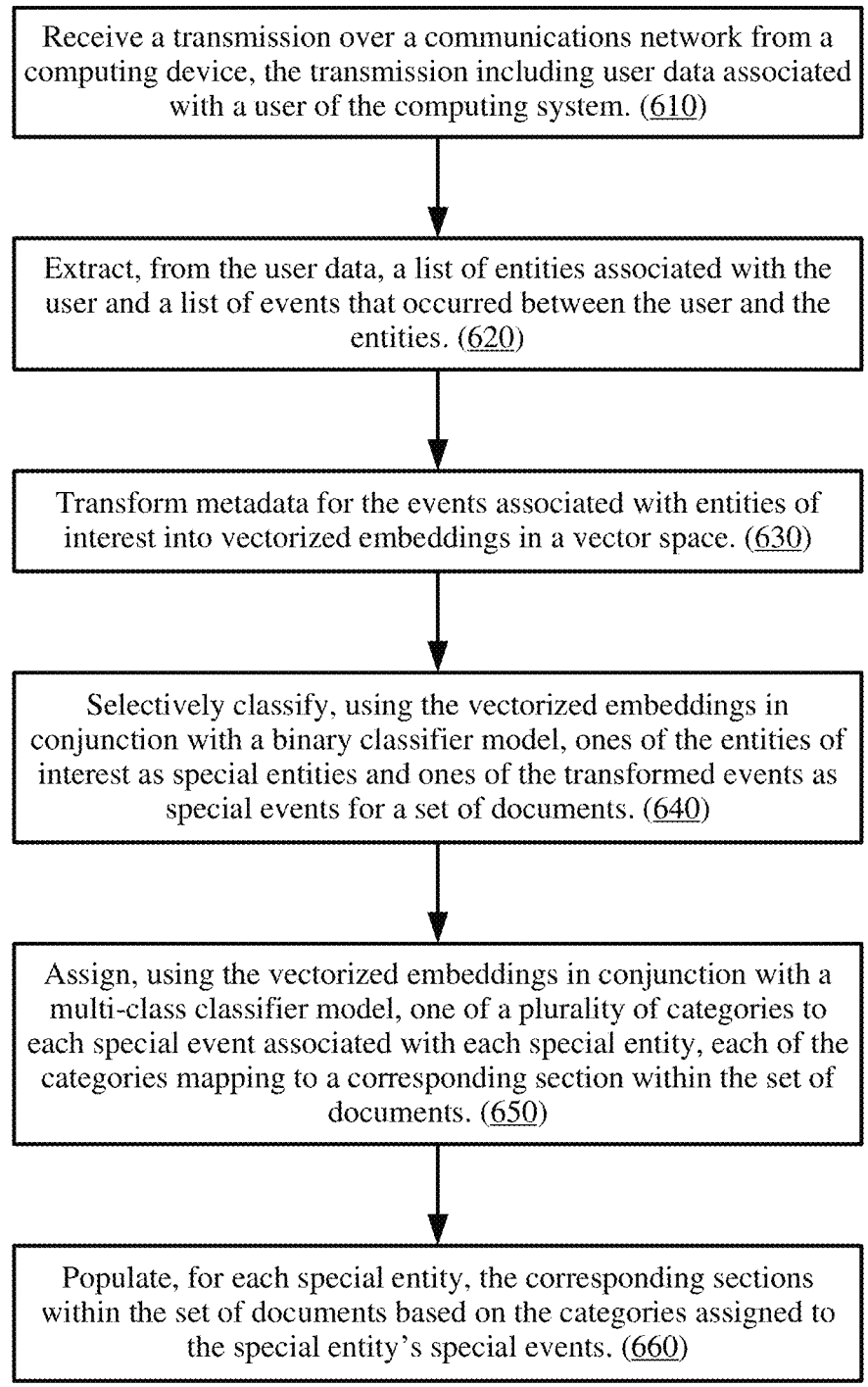
FIG. 6 shows an illustrative flowchart depicting an example operation for automatically populating documents about special entities, according to some implementations.

FIG. 6 shows an illustrative flowchart 600 depicting an example operation for automatically populating documents about special entities, according to some implementations, and may be performed by one or more processors of a computing system, such as the computing system 100 described with respect to FIG. 1. For example, at block 610, the computing system 100 receives a transmission over a communications network from a computing device, the transmission including user data associated with a user of the computing system. At block 620, the computing system 100 extracts, from the user data, a list of entities associated with the user and a list of events that occurred between the user and the entities. At block 630, the computing system 100 transforms metadata for the events associated with entities of interest into vectorized embeddings in a vector space. At block 640, the computing system 100 selectively classifies, using the vectorized embeddings in conjunction with a binary classifier model, ones of the entities of interest as special entities and ones of the transformed events as special events for a set of documents. At block 650, the computing system 100 assigns, using the vectorized embeddings in conjunction with a multi-class classifier model, one of a plurality of categories to each special event associated with each special entity, each of the categories mapping to a corresponding section within the set of documents. At block 660, the computing system 100 populates, for each special entity, the corresponding sections within the set of documents based on the categories assigned to the special entity's special events.

As used herein, a phrase referring to "at least one of" a list of items refers to any combination of those items, including single members. As an example, "at least one of: a, b, or c" is intended to cover: a, b, c, a-b, a-c, b-c, and a-b-c. Similarly, unless noted otherwise, "or" is used inclusively herein, such that "a, b, or c" refers to any combination of those items, including single members.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described, in terms of functionality, and illustrated in the various illustrative components, blocks, modules, circuits and processes described above. Whether such functionality is implemented in hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A computer-implemented method for automatically populating documents about special entities, the method performed by one or more processors of a computing system and comprising:

receiving a transmission over a communications network from a computing device, the transmission including user data associated with a user of the computing system;

extracting, from the user data, a list of entities associated with the user and a list of events that occurred between the user and the entities;

transforming metadata for the events associated with entities of interest into vectorized embeddings in a vector space;

selectively classifying, using the vectorized embeddings in conjunction with a binary classifier model, ones of the entities of interest as special entities and ones of the transformed events as special events for a set of documents;

assigning, using the vectorized embeddings in conjunction with a multi-class classifier model, one of a plurality of categories to each special event associated with each special entity, each of the categories mapping to a corresponding section within the set of documents; and populating, for each special entity, the corresponding sections within the set of documents based on the categories assigned to the special entity's special events.

2. The method of claim 1, further comprising:
identifying, within the list of entities, the entities of interest for the set of documents based on the metadata.

3. The method of claim 2, wherein the metadata for a given entity includes at least an identifier for the given entity, the metadata for a given event includes at least one quantity associated with the given event, and identifying the entities of interest includes:

selectively filtering, using the metadata in conjunction with one or more rule-based filters, ones of the entities from the list of entities, the selective filtering including:
responsive to determining that the identifier for a given entity appears on an exclusion list, removing the given entity from the list of entities; and
responsive to determining that an aggregation metric generated based on the quantities for the events associated with the given entity does not exceed a threshold, removing the given entity from the list of entities; and
identifying the remaining entities as the entities of interest.

4. The method of claim 3, wherein the metadata for the given entity further includes a location of the given entity, and wherein the selective filtering further includes:
responsive to determining that the location for a given entity is outside of an area of interest, removing the given entity from the list of entities.

5. The method of claim 3, wherein the metadata for each event further includes a type of the event, and wherein the selective filtering further includes:
identifying ones of the events having an excluded type, wherein the aggregation metric excludes the quantities for the identified ones of the events.

6. The method of claim 1, wherein transforming the metadata for the events into the vectorized embeddings includes:
extracting, from the list of events, a set of features and attributes for each event;
generating, using a sentence transformer, a plurality of feature vectors from the sets of features and attributes, wherein the sentence transformer is a language model (LM) fine-tuned using a sentence transforming learning technique, and wherein the feature vectors incorporate semantic meaning and context from the sets of features and attributes; and
embedding the plurality of feature vectors in the vector space.

7. The method of claim 1, further comprising:
selectively preclassifying, using a set of predefined attributes in conjunction with a nearest neighbor technique, the transformed events as special events for the set of documents.

8. The method of claim 7, wherein the predefined attributes include positive attributes suggestive of an event being a special event and negative attributes suggestive of an event not being a special event, and wherein selectively preclassifying the transformed events as special events includes:
vectorizing the set of predefined attributes;
embedding the vectorized attributes in the vector space;
generating a tree-based index based on the embeddings;
performing, using an approximate nearest-neighbor (ANN) technique in conjunction with the tree-based index, a proximity analysis of each respective event;
determining, for each respective event, whether the respective event has one or more neighbors in the tree-based index within a threshold distance based on the proximity analyses; and
selectively preclassifying each respective event based on whether the respective event has the one or more neighbors in the tree-based index within the threshold distance, the selective preclassifying including:
refraining from preclassifying the respective event and submitting the respective event to the binary classifier model responsive to determining that the respective event does not have one or more neighbors in the tree-based index within the threshold distance; and
selectively preclassifying the respective event responsive to determining that the respective event does have one or more neighbors in the tree-based index within the threshold distance, the selective preclassifying including:
preclassifying the respective event as a special event when more than a threshold proportion of the neighbors within the threshold distance are associated with the positive attributes;
preclassifying the respective event as not a special event when more than the threshold proportion of the neighbors within the threshold distance are associated with the negative attributes; and
refraining from preclassifying the respective event and submitting the respective event to the binary classifier model when the neighbors within the threshold distance do not exceed the threshold proportion with respect to the positive attributes or the negative attributes.

9. The method of claim 8, further comprising, for a given preclassified event:
generating a first set of bigrams from the positive attributes;
generating a second set of bigrams from the negative attributes;
generating a third set of bigrams from the metadata associated with the given preclassified event;
determining, for each respective bigram in the third set of bigrams, an edit distance between the respective bigram and each bigram in the first and second sets of bigrams, wherein the edit distance is a Levenshtein distance; and
selectively reclassifying the preclassified event based on the edit distances, the selective reclassification including:

reclassifying the preclassified event responsive to determining that the event was preclassified as a special event and that at least one bigram in the third set of bigrams has an edit distance below a threshold with at least one of the bigrams in the second set of bigrams;

reclassifying the preclassified event responsive to determining that the event was preclassified as not a special event and that at least one bigram in the third set of bigrams has an edit distance below the threshold with at least one of the bigrams in the first set of bigrams; and refraining from reclassifying the preclassified event responsive to determining that (i) the event was preclassified as a special event and none of the bigrams in the third set of bigrams has an edit distance below the threshold with any of the bigrams in the second set of bigrams or (ii) the event was preclassified as not a special event and none of the bigrams in the third set of bigrams has an edit distance below the threshold with any of the bigrams in the first set of bigrams.

10. The method of claim 9, wherein reclassifying the given event comprises reversing the preclassification for the given event or submitting the given event to the binary classifier model.

11. The method of claim 1, wherein the binary classifier model is a random forest model trained, using labeled events in conjunction with a random forest learning technique, to predict whether a new entity is a special entity for the set of documents and whether a new event is a special event for the set of documents.

12. The method of claim 11, wherein the random forest model is fine-tuned to prioritize recall over precision.

13. The method of claim 11, further comprising:
responsive to classifying a given entity as not a special entity, excluding the events associated with the given entity from the set of documents.

14. The method of claim 1, further comprising:
selectively excluding ones of the special entities based on the special events, wherein the selective exclusion includes:
identifying ones of the events associated with the special entity that are classified as special events;
generating an aggregation metric based on the identified special events; and
selectively excluding the special entity based on whether the aggregation metric exceeds a threshold, the selective exclusion including:
refraining from excluding the special entity responsive to determining that the aggregation metric exceeds the threshold; and
excluding the special entity from the set of documents responsive to determining that the aggregation metric does not exceed the threshold.

15. The method of claim 1, wherein the multi-class classifier is a random forest model trained, using labeled events in conjunction with a random forest learning technique, to predict which of a plurality of classes most closely matches a given event.

16. The method of claim 15, wherein each of the plurality of categories corresponds to one of the plurality of classes, and wherein assigning a category to a given special event includes:

generating, for each respective category of the plurality of categories, a confidence score indicating an extent to which the given special event is predicted to match the respective category;
identifying, for the given special event, a highest scoring category associated with a highest confidence score; and
classifying the given special event into the highest scoring category.

17. The method of claim 16, wherein the random forest model is iteratively retrained to generate predictions based on revised guidelines, the iterative retraining including:
feeding, to a language model (LM), the revised guidelines and historical guidelines previously used to train the random forest model;
identifying, based on an output of the LM, one or more changes in the guidelines;
generating updated trained data for the random forest model based on the identifies changes in the guidelines; and
retraining the random forest model using the updated training data.

18. The method of claim 1, further comprising, for a given special entity:
determining that two or more special events are mapped to a same section within the set of documents;
generating, for the same section, an aggregation metric based on the metadata associated with the two or more special events; and
populating the same section based on the generated aggregation metric.

19. The method of claim 1, further comprising:
generating a summary, in at least near real-time with the receiving of the user data, the summary indicating at least one of the special entities, the special events, or the populated documents, wherein the summary includes a plain text reasoning for the classification of at least one of the special entities or the special events;
after receiving the user data and prior to presenting the summary, presenting a progress visualization to the user for a minimum amount of time longer than the at least near real-time;
presenting the summary to the user along with an option to modify at least one of the special entities, special events, or populated documents, wherein the summary is regenerated responsive to receiving one or more modifications from the user;
requesting an approval of the summary from the user, wherein the documents are populated after receiving the user's approval; and
at least one of:
providing, to each special entity, the set of the documents populated based on the special entity's events; or
providing the populated documents to one or more higher level entities.

20. A system for automatically populating documents about special entities, the system comprising:
one or more processors; and
at least one memory coupled to the one or more processors and storing instructions that, when executed by the one or more processors, cause the system to perform operations including:
receiving a transmission over a communications network from a computing device, the transmission including user data associated with a user of the system;

extracting, from the user data, a list of entities associated with the user and a list of events that occurred between the user and the entities;

transforming metadata for the events associated with entities of interest into vectorized embeddings in a vector space;

selectively classifying, using the vectorized embeddings in conjunction with a binary classifier model, ones of the entities of interest as special entities and ones of the transformed events as special events for a set of documents;

assigning, using the vectorized embeddings in conjunction with a multi-class classifier model, one of a plurality of categories to each special event associated with each special entity, each of the categories mapping to a corresponding section within the set of documents; and populating, for each special entity, the corresponding sections within the set of documents based on the categories assigned to the special entity's special events.

\* \* \* \* \*